US007546522B2

(12) United States Patent
Tolle et al.

(10) Patent No.: US 7,546,522 B2
(45) Date of Patent: Jun. 9, 2009

(54) METHOD, SYSTEM, AND COMPUTER-READABLE MEDIUM FOR APPLYING A GLOBAL FORMATTING SCHEME TO A CHART IN AN ELECTRONIC DOCUMENT

(75) Inventors: Kristin M. Tolle, Redmond, WA (US); Brian S. Ruble, Bellevue, WA (US); Miltiadis Vafiadis, Redmond, WA (US); Sander Viegers, Seattle, WA (US); Daniel P. Cory, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 180 days.

(21) Appl. No.: 11/018,716

(22) Filed: Dec. 20, 2004

(65) Prior Publication Data

US 2006/0136819 A1   Jun. 22, 2006

(51) Int. Cl.
  *G06F 17/21* (2006.01)
  *G06F 17/24* (2006.01)
(52) U.S. Cl. .............. 715/215; 715/201; 715/212; 715/243; 715/248; 715/249; 715/273; 715/275
(58) Field of Classification Search .............. 715/500.1, 715/517, 522, 523, 526, 908, 201, 212, 215, 715/243, 248, 249, 273, 275
See application file for complete search history.

(56) References Cited

U.S. PATENT DOCUMENTS

| 6,529,217 | B1 * | 3/2003 | Maguire et al. ............. 715/769 |
| 6,580,438 | B1 | 6/2003 | Ichimura et al. |
| 6,822,650 | B1 * | 11/2004 | Davis et al. ............. 345/441 |
| 7,007,229 | B2 * | 2/2006 | DelGobbo et al. .......... 715/513 |
| 7,170,519 | B2 * | 1/2007 | Patel et al. ............. 345/440 |

(Continued)

FOREIGN PATENT DOCUMENTS

EP    1 241 591 A2    9/2002

OTHER PUBLICATIONS

Halverson et al., Microsoft Office XP Inside Out, 2001, Microsoft Press, pp. 757-760.*

(Continued)

*Primary Examiner*—Joshua D Campbell
(74) *Attorney, Agent, or Firm*—Merchant & Gould P.C.

(57) ABSTRACT

A method, system, and computer-readable medium are provided for applying a global formatting scheme to a chart in an electronic document. According to a system, a chart application program receives a selection of a chart object in the electronic document and a document theme. The document theme includes a combination of formatting schemes including a color scheme, a font scheme, and a style matrix. The chart application program then automatically applies the selected document theme to the selected chart object in the electronic document. In applying the selected document theme to the selected chart object, the chart application program automatically updates a number of properties of the chart object including color, font, line, effect, and fill. The chart application further enables a user to modify a selected chart style in the document theme by modifying the elements related to the selected chart style and saving the chart type of the selected chart object and the modified chart style as a custom chart template to a file. When a user opens the file, the chart application automatically updates an existing chart template gallery to include the custom chart template.

14 Claims, 5 Drawing Sheets

U.S. PATENT DOCUMENTS

2003/0193502 A1* 10/2003 Patel et al. .................. 345/440
2003/0233620 A1    12/2003 Chaitra et al.
2006/0004718 A1*  1/2006 McCully et al. ................ 707/3

OTHER PUBLICATIONS

Anonymous: "Introduction to Microsoft Word97 for Windows 95/98 - A Guide to Basic Features", Sep. 1997 (Sep. 1997), pp. 39-40, XP002481901. URL: http://www.unt.edu/training/Word97Intro.PDF>.

N.N.: "Step by Step Microsoft Excel 2000". Microsoft Press, 1999, pp. 163-179, XP002507504.

Asman P: "Creating SVG Pie charts through XSLT via web services". SVG.Open/Carto.Net Developers Conference, XX, XX, Jun. 13, 2003, pp. 1-14, XP002483908.

* cited by examiner

METHOD, SYSTEM, AND COMPUTER-READABLE MEDIUM FOR APPLYING A GLOBAL FORMATTING SCHEME TO A CHART IN AN ELECTRONIC DOCUMENT

BACKGROUND OF THE INVENTION

When creating charts, users of charting programs (such as spreadsheet application programs, word processing application programs, and presentation application programs) often use formatting tools to give chart elements a consistent format so that charts have a professional and modern look. For instance, in many corporate environments standardized charting styles are developed in which all charts have a consistent theme (e.g., a predetermined combination of colors and fonts) for use across an organization. In order to format a chart, a user may select individual the elements and data series which make up a chart and manually format each selected element and data series in a piece-meal fashion until a consistent theme is developed.

In applying a previously created chart format to other charts, a user copy the chart having the desired format and paste the format of the copies chart onto a selected "target" chart. Alternatively, a user or organization may develop and deploy user-defined chart types to other users who wish to use the same format. The user-defined chart types may be stored in a gallery file in a specified path on each user's computer.

Although these traditional methods allow for the formatting of charts and the deployment of a consistent format to other charts, they suffer from a number of drawbacks which make these methods undesirable. First, the piece-meal method of applying fine-grain formatting to individual elements and data series in a chart is a time consuming and often frustrating process which may require a user to discover different locations for editing tools to complete each formatting task. Furthermore, in discovering the editing tools for formatting a chart, users may be presented with unfamiliar terminology and commands which must be executed to complete a formatting task. Second, the copy and paste method of spreading a format to other charts requires invoking a specialized dialog in the user's application program and selecting a specific option (i.e., "Paste Special") which is neither easily discoverable nor intuitive. Finally, the development and deployment of user-defined chart types requires the gallery file to be overwritten whenever updates are made. Thus, any modifications or additions made to the gallery file by a user are lost when the gallery file is redeployed.

It is with respect to these considerations and others that the various embodiments of the present invention have been made.

BRIEF SUMMARY OF THE INVENTION

In accordance with the present invention, the above and other problems are solved by a method, system, and computer-readable medium for applying a global formatting scheme to a chart in an electronic document. According to one aspect of the invention, a method is provided for applying a global formatting scheme to a chart in an electronic document created in a chart application program. The method includes receiving a selection of a chart object in the electronic document and receiving a selection of a document theme. The document theme includes a combination of a plurality of formatting schemes including a color scheme, a font scheme, and a style matrix. The plurality of formatting schemes may be defined in a base style definition ("BSD") in the document theme. The BSD may be defined according to an extensible markup language ("XML") schema. The method further includes applying the selected document theme to the selected chart object in the electronic document. In applying the selected document theme to the selected chart object, the method includes updating a plurality of properties of the chart object. The chart properties may include color, font, line, effect, and fill.

The method may further include, in response to a user input, displaying a plurality of chart styles from a styles gallery associated with the selected document theme and receiving a selection of a chart style from the plurality of chart styles in the styles gallery. In displaying a plurality of chart styles from a styles gallery associated with the selected document theme, the method includes displaying a plurality of chart styles of the same chart type as the selected chart object in the electronic document. The method may further include, in response to a user input, modifying the selected chart style by modifying a plurality of elements related to the selected chart style and saving the chart type of the selected chart object and the modified chart style as a custom chart template to a file. The method may further include, in response to opening the file, updating a chart template gallery to include the custom chart template. The chart template gallery may include a plurality of chart types and formatting schemes to be applied to chart data associated with the chart object in the electronic document.

The invention may be also implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
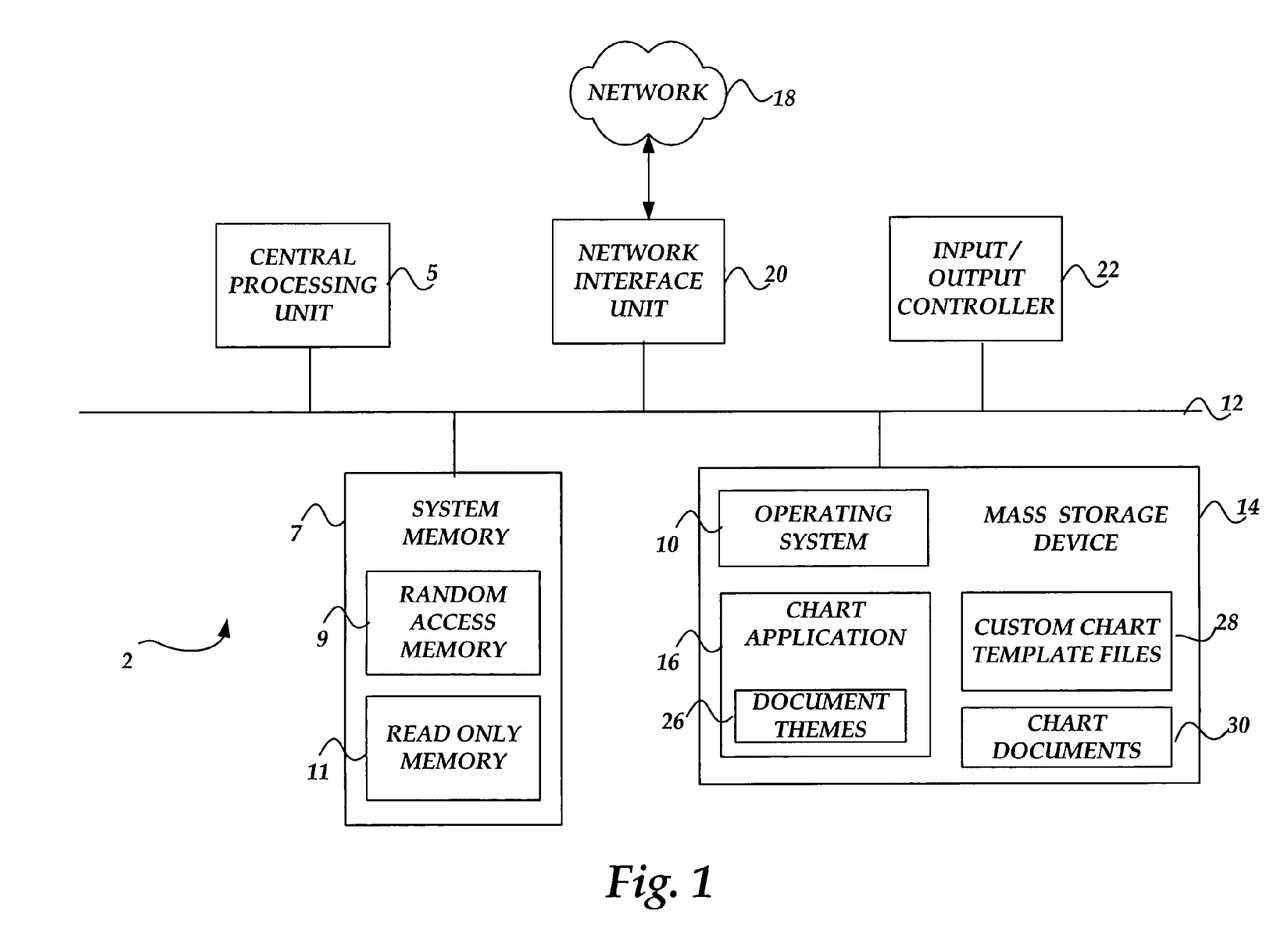
FIG. 1 is a computer system architecture diagram illustrating a computer system utilized in and provided by the various embodiments of the invention.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The computer 2 is also capable of executing one or more application programs. In particular, the computer 2 is operative to execute a chart application 16. As known to those skilled in the art, the chart application 16 provides functionality for creating charts from data values which may be organized using cells. The chart application 16 also provides capabilities for applying a variety of formatting options for text, numeric values, and other features comprising a chart.

According to illustrative embodiments of the invention and as will be described in greater detail below, the chart application 16 may be utilized to apply global formatting schemes which are contained in a collection of predefined document themes 26, to charts. The formatting schemes may include, but are not limited to, color schemes, font schemes, and style matrices (i.e., fixed matching collections of fills, lines, and effects). The chart application program 16 may be further utilized to create and save custom chart template files 28 and chart documents 30 which may contain global formatting from a predefined document theme which has been modified by a user.

According to one embodiment of the invention, the chart application 16 comprises the OFFICE suite of application programs including the EXCEL spreadsheet application program, the WORD word processing application program, and the POWERPOINT presentation application program from MICROSOFT CORPORATION of Redmond, Wash. It should be appreciated, however, that the various aspects of the invention described herein may be utilized with other application programs from other manufacturers. Moreover, although the inventive aspects described herein are presented in the context of the application programs identified above, it should be appreciated that other types of application programs may also be utilized to embody the various aspects of the invention. Additional details regarding the various functions performed by the chart application 16 will be provided below with respect to FIGS. 2-8.

Figure 2:
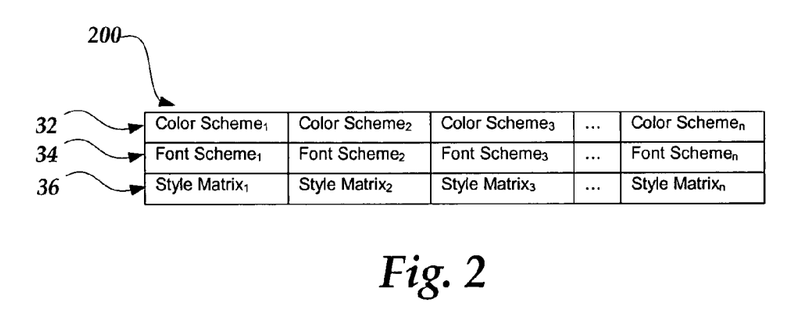
FIG. 2 is a table showing a generic formatting scheme utilized by document themes which are generated by the chart application program in the computer system of FIG. 1, according to an illustrative embodiment of the invention.

Referring now to FIG. 2, a table showing a generic formatting scheme 200 utilized by the document themes 26 in accordance with an illustrative embodiment of the invention will be described. As briefly discussed above, the document themes 26 contain a global formatting scheme which may be applied to charts. The formatting scheme 200 includes a predefined combination of Color Schemes 32, Font Schemes 34, and Style Matrices 36. It will be appreciated that the Color Schemes 32 may include a number of main colors as well as accent colors, the Font Schemes 34 may include a major font (e.g., a bold font or large type font) and a minor font (e.g., a small type font), and that the Style Matrices 36 may define fills, lines, backgrounds, and effects for chart elements, any of which may be null (i.e., no style), subtle, moderate, or intense. It should be understood that each document may have one and only one document theme and that the chart application 16 may include a default document theme containing neutral formatting schemes to be globally applied to all tables, charts, word art, etc., in an electronic document.

Figure 3:
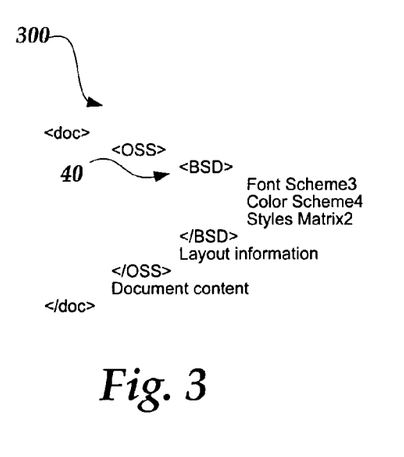
FIG. 3 is a schema for defining a base style definition for a document theme generated by the chart application program in the computer system of FIG. 1, according to an illustrative embodiment of the invention.

Referring not to FIG. 3, a schema 300 for defining a Base Style Definition ("BSD") 40 for a document theme in accordance with an illustrative embodiment of the invention will now be described. The BSD 40 in the schema 300 includes the various formatting schemes (i.e., font scheme, color scheme, and styles matrix) for a document theme. It will be appreciated that the schema 300 may also define layout information for chart elements and document content to be associated with the BSD. The BSD may be included in a style sheet (e.g., an Office Style Sheet) which may be utilized to store document theme data. It will be further appreciated that the schema 300 may be an extensible markup language ("XML") document. Office Style Sheets and XML are well known to those skilled in the art and thus will not be described further herein.

Figure 4:
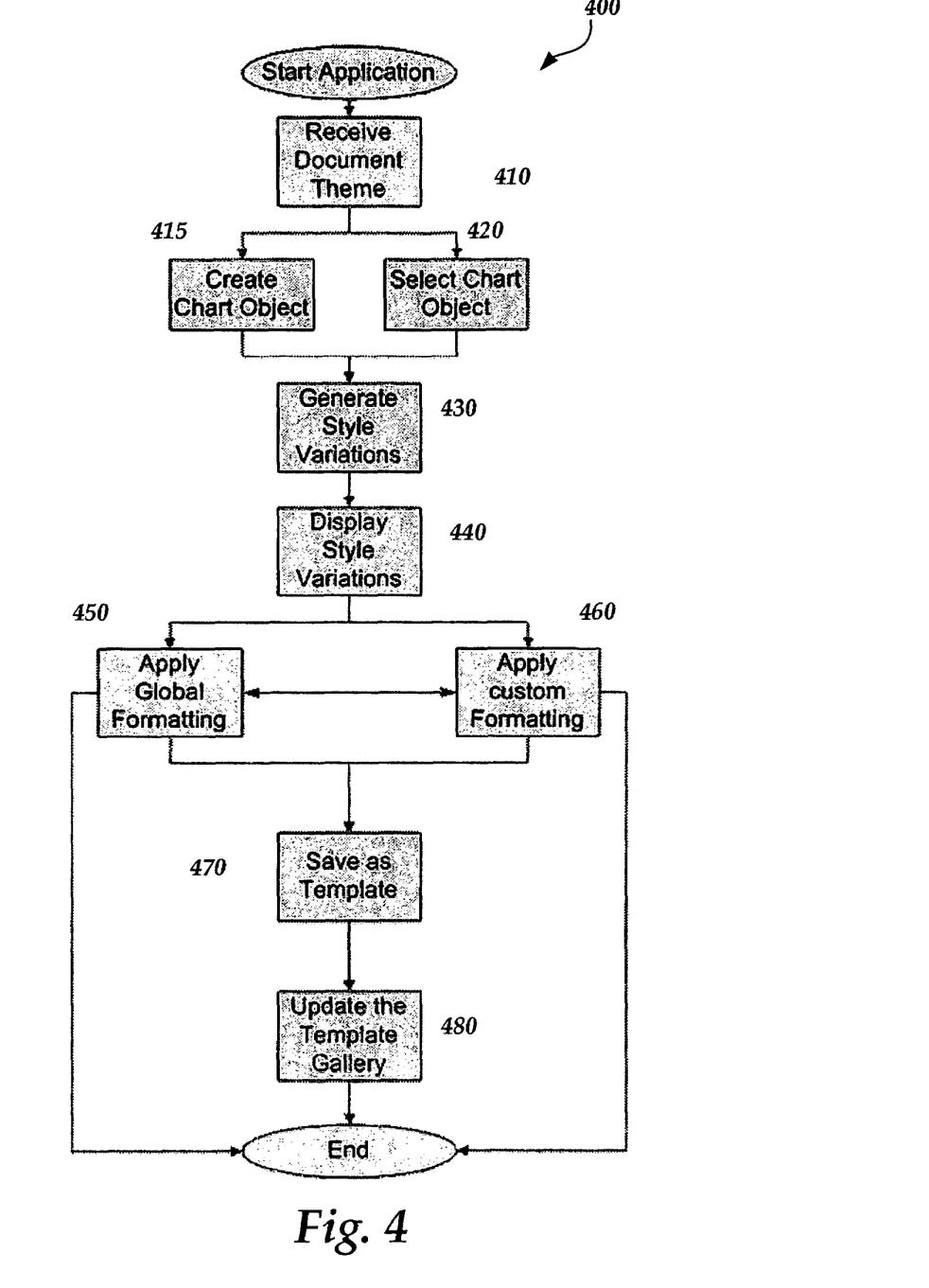
FIG. 4 is an illustrative routine performed by the chart application program in the computer system of FIG. 1 for applying a global formatting scheme to a chart in an electronic document, according to an illustrative embodiment of the invention.

Referring now to FIG. 4, an illustrative routine 400 performed by the chart application 16 for applying a global formatting scheme to a chart in an electronic document in accordance with an illustrative embodiment of the invention will be described. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 4, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400 begins at operation 410 where the chart application 16 receives a selection of a document theme. In particular, the chart application 16 generates several related style variations that can be applied to chart objects. It will be appreciated that the chart application 16 may provide a document theme for selection by a user by launching a charting user interface. Alternatively, a document theme may be selected from the document in which the chart may be embedded.

Figure 5:
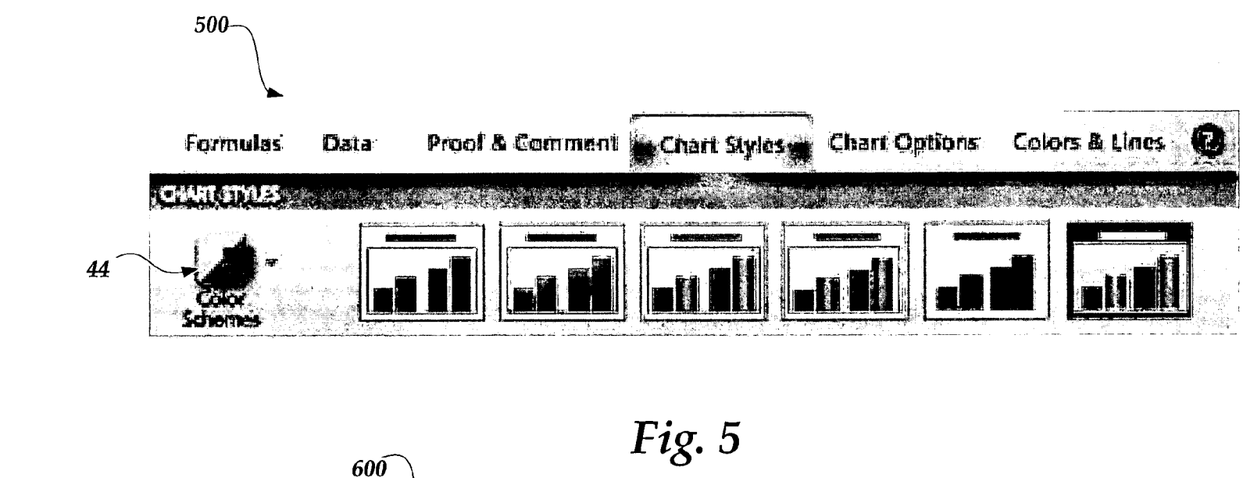
FIGS. 5-6 are screen diagrams illustrating an aspect of the invention for providing a facility through which a user may select and modify chart styles associated with a document theme to be applied to a chart, according to an illustrative embodiment of the invention.
Figure 6:
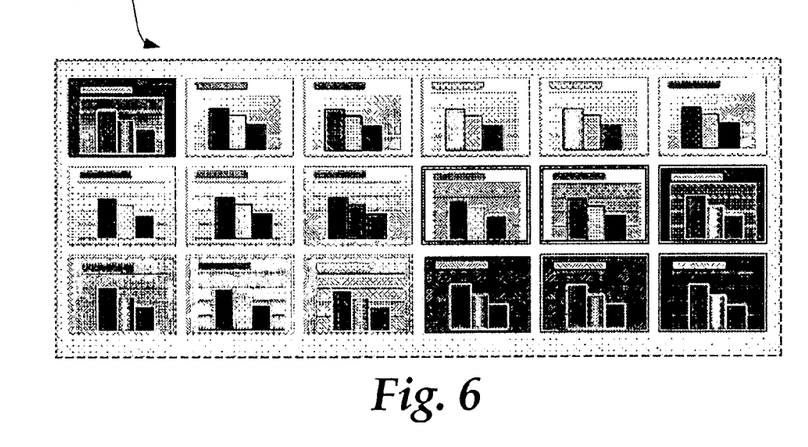

Once the selection of a theme is received by the chart application 16, the routine 400 then continues to operations 410 and 415 where the chart application 16 receives a user instruction to create a chart (operation 410) or a user selection of an existing chart (operation 415) in order to interact with the charting user interface. In particular, the user, upon selecting a document theme from which to create or select a chart, may be presented with a chart styles variation gallery displaying thumbnail views of visual chart style icons matching the currently selected document theme. For instance, the chart styles variation gallery may include a set of chart style icons showing subtle, moderate, and intense views of the same chart format. In response to a user input, the chart application 16 may further open a dropdown and display a full chart styles gallery which may include a preconfigured collection of thumbnail images showing chart styles matching the currently selected document theme. It will be appreciated that the chart styles variation gallery and the dropdown chart styles gallery includes thumbnails that are of the same chart type as the currently selected chart. For instance, if a user has a bar chart selected, the thumbnails in the styles variation gallery and the styles gallery will only show bar charts. Illustrative screenshots showing a chart styles variation gallery and a full chart styles gallery are shown in FIGS. 5-6 and will be discussed in greater detail below.

The routine 400 continues from operations 415 and 420 to operation 430 where the chart application 16 generates style variations for the created or selected chart object. From operation 430, the routine 400 continues at operation 440 where the chart application displays the generated style variations to a user. The routine 400 then continues at operations 450 and 460 where the chart application 16 applies either global formatting (operation 450) or custom formatting (operation 460) to the created or selected chart objects. In particular, the chart application 16 may apply a style from the chart styles variation gallery to a chart object or, alternatively apply fine grain formatting to a chart object, in response to a user input.

The routine 400 continues from operations 450 and 460 at operation 470 where the chart application 16 saves the document containing the selected and/or created chart objects or save any special or fine grain formatting applied to chart objects as a chart template. A user interface for saving custom or "special formatting" chart templates is shown in FIG. 7 and will be described in greater detail below.

Figure 8:
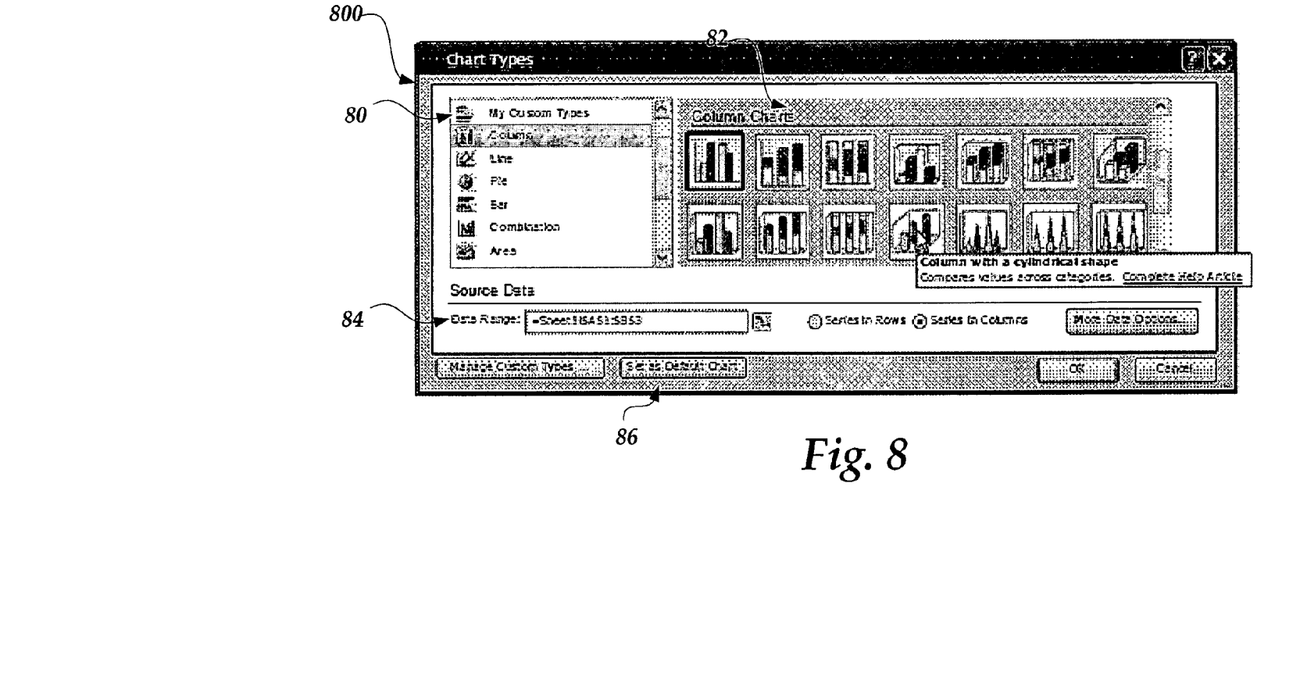
FIG. 8 is a screen diagram illustrating an aspect of the invention for providing a facility through which a user may select a custom chart template from a template gallery for creating charts, according an illustrative embodiment of the invention.

The routine 400 continues at operation 480 where the chart application 16 updates a chart template gallery with the special formatting or custom chart templates. In particular, the chart application 16 may be utilized to generate a template gallery of custom chart templates representing modified document themes (i.e., modified chart styles) which may be applied to charts in electronic documents. Custom chart templates may be stored as template files in the computer system 2. It should be understood that custom chart templates which are applied to charts may result in a change in chart type as well as chart formatting. It should be further understood that custom chart templates may also be used to create charts. For instance, a custom pie chart template applied to an existing bar chart in an electronic document will result in the representation of the underlying data from the bar chart to be represented as a pie chart as well as the application of any formatting related to the pie chart template. Thus, a chart template may be utilized to override any preexisting document themes when applied to a preexisting chart. A user interface for selecting and applying chart templates is shown in FIG. 8 and will be described in greater detail below. The routine 400 then ends.

Referring now to FIGS. 5-6, screenshots of a chart styles variation gallery 500 (FIG. 5) and a full chart styles gallery 600 (FIG. 6) according to an illustrative embodiment of the invention will be described. The chart styles variation gallery 500 includes a dropdown 44 for displaying the chart styles gallery 600. As discussed above with respect to FIG. 4, the chart styles variation gallery 500 includes selected thumbnails of alternative chart styles (i.e., subtle, moderate, and intense versions) for a document theme. The chart styles gallery 600 includes a plurality of thumbnail images of chart styles which may be selected by a user to replace a default chart style for the currently selected document theme. For instance, a user wishing to add a more colorful chart style than the default (i.e., neutral) chart style provided by the document theme may select a more vibrant chart style from the gallery 600.

Figure 7:
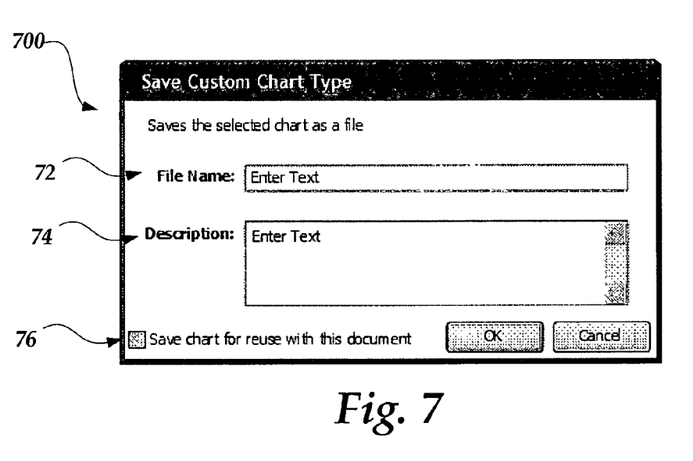
FIG. 7 is a screen diagram illustrating an aspect of the invention for providing a facility through which a user may save a modified chart style as a custom chart type which may be applied to a chart, according to an illustrative embodiment of the invention.

Referring now to FIG. 7, a user interface 700 for saving a custom chart type in accordance with an illustrative embodiment of the invention will be described. As discussed above with respect to FIG. 4, the chart application 16 enables a user to modify an existing chart style in a selected document theme and, after the modification is applied to a chart object, to save the modification as a custom chart type. As discussed above, the custom chart type may be saved as a template file or a chart document file. The user interface 700 includes a File Name 72 box for naming the custom chart type, a Description 74 box for entering description text for the custom chart type, and a checkbox 76 which allows a user to save the chart so that it may be reused with the current document.

Referring now to FIG. 8, a user interface 800 for creating and modifying charts using custom chart templates, in accordance with an illustrative embodiment of the invention, will be described. The user interface 800 includes a category list 80 of custom chart types which may be selected by a user. Each category list 80 has an associated gallery 82 of custom charts which may be selected by a user and applied to a data range 84 containing data to be represented in a chart. The user interface 800 also includes a button 86 for setting a custom chart as a default chart in the custom chart gallery 82.

It will be appreciated that in one embodiment, custom chart type files may be sent from one user to another user to introduce new chart types to a custom chart types template when the file is opened on the receiving user's computer. For instance, when a new custom chart type template file or chart file is opened on the receiving user's computer, the chart application 16 automatically updates the gallery 82 to display the received chart type. It will be appreciated that data describing the chart type associated with a chart document or template file is embedded in the file and may be extracted and displayed in a custom chart template gallery once the file is opened by the chart application 16. If after viewing the new chart type, the receiving user wishes to keep it on her computer, she may add the chart type by saving it to the custom chart template.

Based on the foregoing, it should be appreciated that the various embodiments of the invention include a method, system, and computer-readable medium for applying a global formatting scheme to a chart in an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for applying a global formatting scheme to a chart in an electronic document created in a chart application program, comprising:

receiving a selection of a chart object in the electronic document;

receiving a selection of a document theme, wherein the document theme comprises a combination of a plurality of formatting schemes including a color scheme, a font scheme, and a style matrix, wherein a base style definition defines the plurality of formatting schemes, wherein receiving a selection of a document theme comprises receiving a selection of the document theme from the electronic document, wherein the chart object is embedded in the electronic document;

using a schema to define the base style definition and define a layout for the electronic document;

in response to a first user input, displaying a plurality of chart styles from a styles gallery associated with the selected document theme, wherein displaying a plurality of chart styles from a styles gallery associated with the selected document theme comprises displaying a plurality of chart styles of the same chart type as the selected chart object in the electronic document; and receiving a selection of a chart style from the plurality of chart styles in the styles gallery;

applying the selected document theme to the selected chart object in the electronic document;

in response to a second user input, modifying the selected chart style by modifying a plurality of elements related to the selected chart style;

saving the chart type of the selected chart object and the modified chart style as a custom chart template to a file;

in response to opening the file on a computer associated with a user of the chart application program, updating a chart template gallery to include the custom chart template, wherein the chart template gallery comprises a plurality of chart types and formatting schemes to be applied to chart data associated with the chart object in the electronic document;

sending the custom chart type template file from a computer associated with a user of the chart application program to computer associated with another user of the chart application program; and in response to opening the file on the computer associated with the another user, automatically updating a chart template gallery on the computer associated with the another user to display the received chart type.

2. The method of claim 1, wherein applying the selected document theme to the selected chart object comprises updating a plurality of properties of the chart object, wherein the chart properties include color, font, line, effect, and fill.

3. The method of claim 1, wherein the base style definition is defined according to an extensible markup language (XML) schema.

4. The method of claim 1, wherein receiving a selection of a chart style from the plurality of chart styles in the styles gallery, comprises receiving a selection of a chart style from a preconfigured collection of thumbnail images showing a plurality of chart styles which match the selected document theme and which are of the same chart type as the selected chart object.

5. The method of claim 1, wherein receiving a selection of a document theme comprises receiving a selection of a document theme comprising a plurality of accent colors, at least one of a major font and a minor font, and at least one of a null, subtle, moderate, and intense for application to the selected chart object.

6. A system for applying a global formatting scheme to a chart in an electronic document, comprising a client computer operative to execute a chart application program for consuming data, the chart application program further operative to receive a selection of a chart object in the electronic document, receive a selection of a document theme, wherein receiving a selection of a document theme comprises receiving a selection of the document theme from the electronic document, wherein the chart object is embedded in the electronic document, wherein the document theme comprises a combination of a plurality of formatting schemes including a color scheme, a font scheme, and a style matrix, wherein a base style definition defines the plurality of formatting schemes, use a schema to define the base style definition and layout information for the electronic document, and apply the selected document theme to the selected chart object in the electronic document, wherein the chart application program is further operative to, in response to a first user input, display a plurality of chart styles from a styles gallery associated with the selected document theme and receive a selection of a chart style from the plurality of chart styles in the styles gallery, wherein displaying a plurality of chart styles from a styles gallery associated with the selected document theme comprises displaying a plurality of chart styles of the same chart type as the selected chart object in the electronic document, wherein the chart application program is further operative to, in response to a second user input, modify the selected chart style by modifying a plurality of elements related to the selected chart style and save the chart type of the selected chart object and the modified chart style as a custom chart template to a file, wherein the chart application program is further operative to, in response to opening the file, update a chart template gallery to include the custom chart template, wherein the chart template gallery comprises a plurality of chart types and formatting schemes to be applied to chart data associated with the chart object in the electronic document, in response to opening the file on a computer associated with a user of the chart application program, update a chart template gallery to include the custom chart template, wherein the chart template gallery comprises a plurality of chart types and formatting schemes to be applied to chart data associated with the chart object in the electronic document, send the custom chart type template file from a computer associated with a user of the chart application program to computer associated with another user of the chart application program, and, in response to opening the file on the computer associated with the another user, automatically update a chart template gallery on the computer associated with the another user to display the received chart type.

7. The system of claim 6, wherein applying the selected document theme to the selected chart object comprises updating a plurality of properties of the chart object, wherein the chart properties include color, font, line, effect, and fill.

8. The system of claim 6, wherein the base style definition is defined according to an extensible markup language (XML) schema.

9. The system of claim 6, wherein the chart application program, in receiving a selection of a chart object in the electronic document, is further operative to receive a selection of a chart style from a preconfigured collection of thumbnail images showing a plurality of chart styles which match the selected document theme and which are of the same chart type as the selected chart object.

10. The system of claim 6, wherein the chart application program, in receiving a selection of a document theme, is further operative to receive a plurality of accent colors, at least one of a major font and a minor font, and at least one of a null, subtle, moderate, and intense for application to the selected chart object.

11. A computer-readable storage medium having computer-executable instructions stored thereon which, when executed by a computer, will cause the computer to perform a method for applying a global formatting scheme to a chart in an electronic document created in a chart application program, comprising:

receiving a selection of a chart object in the electronic document;

receiving a selection of a document theme, wherein receiving a selection of a document theme comprises receiving a selection of the document theme from the electronic document, wherein the chart object is embedded in the electronic document, wherein the document theme comprises a combination of a plurality of formatting schemes including a color scheme, a font scheme, and a style matrix, wherein a base style definition defines the plurality of formatting schemes;

using a schema to define the base style definition and define a layout for the electronic document;

in response to a first user input, displaying a plurality of chart styles from a styles gallery associated with the selected document theme, wherein displaying a plurality of chart styles from a styles gallery associated with the selected document theme comprises displaying a plurality of chart styles of the same chart type as the selected chart object in the electronic document;

receiving a selection of a chart style from the plurality of chart styles in the styles gallery;

applying the selected document theme, including the selected chart style, to the selected chart object in the electronic document;

in response to a second user input, modifying the selected chart style by modifying a plurality of elements related to the selected chart style; and saving the chart type of the selected chart object and the modified chart style as a custom chart template to a file;

in response to opening the file on a computer associated with a user of the chart application program, updating a chart template gallery to include the custom chart template, wherein the chart template gallery comprises a plurality of chart types and formatting schemes to be applied to chart data associated with the chart object in the electronic document;

sending the custom chart type template file from a computer associated with a user of the chart application program to computer associated with another user of the chart application program; and in response to opening the file on the computer associated with the another user, automatically updating a chart template gallery on the computer associated with the another user to display the received chart type.

12. The computer-readable medium of claim 11, wherein the base style definition is defined according to an extensible markup language (XML) schema.

13. The computer-readable medium of claim 11, wherein receiving a selection of a chart style from the plurality of chart styles in the styles gallery, comprises receiving a selection of a chart style from a preconfigured collection of thumbnail images showing a plurality of chart styles which match the selected document theme and which are of the same chart type as the selected chart object.

14. The computer-readable medium of claim 11, wherein receiving a selection of a document theme comprises receiving a plurality of accent colors, at least one of a major font and a minor font, and at least one of a null, subtle, moderate, and intense for application to the selected chart object.

* * * * *